UNITED STATES PATENT OFFICE.

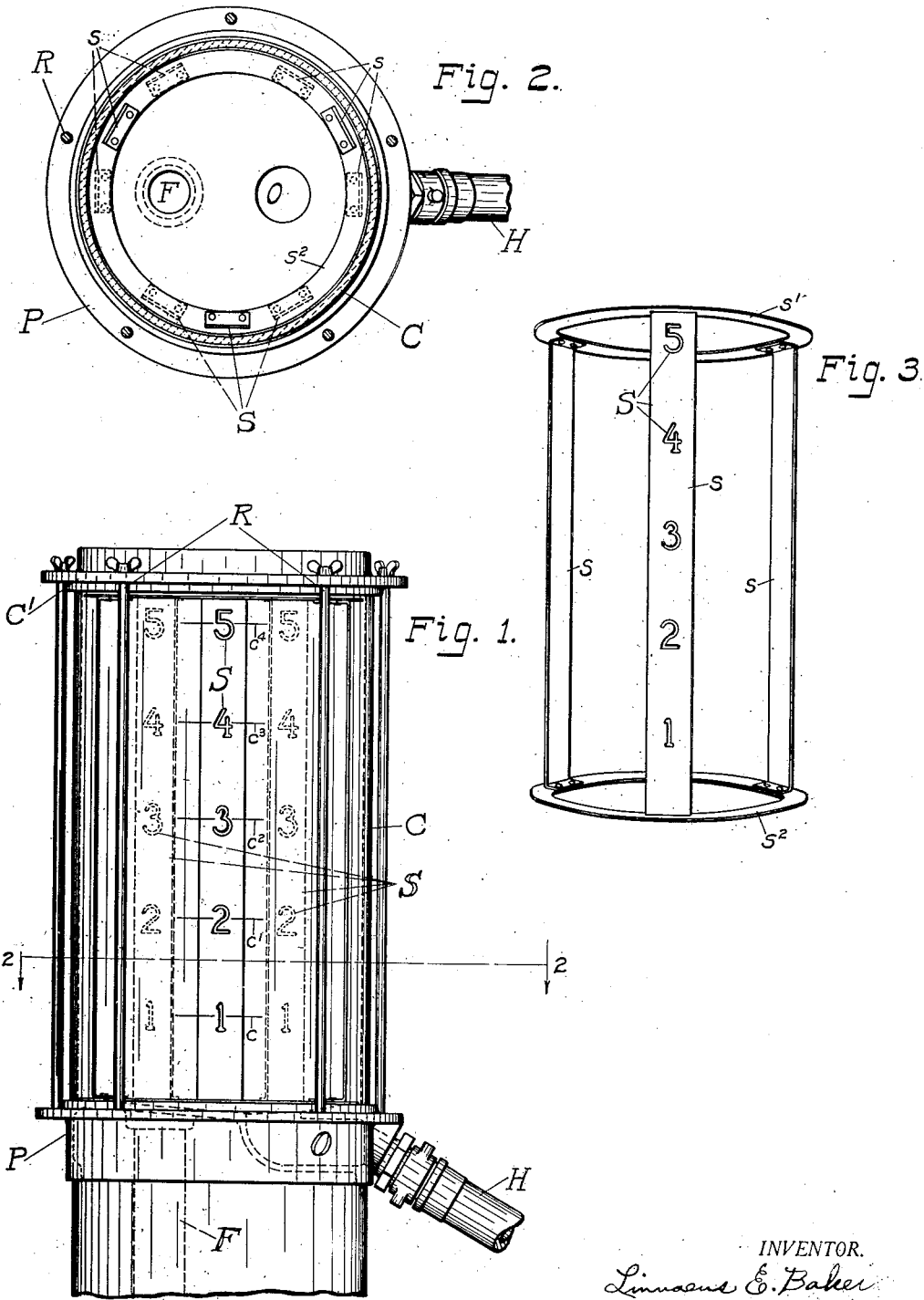

LINNAEUS E. BAKER, OF FORT WAYNE, INDIANA, ASSIGNOR TO WAYNE OIL TANK AND PUMP COMPANY, OF FORT WAYNE, INDIANA, A CORPORATION OF INDIANA.

SCALE FOR TRANSPARENT VESSELS FOR LIQUIDS.

1,409,993.  Specification of Letters Patent.  Patented Mar. 21, 1922.

Application filed August 9, 1920. Serial No. 402,394.

*To all whom it may concern:*

Be it known that I, LINNAEUS E. BAKER, a citizen of the United States, residing at Fort Wayne, in the county of Allen and State of Indiana, have invented new and useful Improvements in Scales for Transparent Vessels for Liquids, of which the following is a specification.

My invention relates to scales for transparent vessels for measuring liquid. The device is designed to be immersed in the liquid to be measured, and may be turned so as to expose to view the numbers on the scale or scales to the best advantage, from any desired position without the vessel.

The device may be quickly and easily removed and replaced, which is a great convenience when the vessel is to be cleaned.

The scale may constitute part of the cage structure, in fact two or three vertically placed scales secured to two or more hoop wires or rings is all the cage needed, or the cage may be complete without any scales and the scale secured to the cage in any way desired.

The particular embodiment of my invention selected for illustration is as applied to the elevated glass container of a so called "visible" measuring and dispensing apparatus for gasoline, in which:—

Figure 1, is an elevation of the container with my scale shown in full lines in one position for use; and with the scale shown in dotted lines turned to other positions for use, Fig. 2, is a cross section through the container, scale, and cage on the line 2—2 of Fig. 1, and Fig. 3, is a perspective of the scale cage, when removed from the container.

It should be borne in mind that the vessels or containers of "visible" measuring and dispensing apparatus, are elevated high enough to drain readily their liquid contents into automobile tanks as the machines are driven along side the dispensing apparatus at the curb, or "island" of the filling station. When the dispensing apparatus is to be used on the curb only one scale is needed as the container will be viewed from a single position; while when used on an "island" of a filling station automobiles will drive up from both sides, so two scales will be needed as the container will be viewed from either of two positions. In either case the cage holding the scale or scales may be turned to that position within the container from which it may be most easily seen by purchasers.

As in such use the containers are substantially above the eye of the purchaser the best practice is to mark lines on the inside of the bottle for the gallons or other quantities to be dispensed, so that because of parallax the buyer will not be deceived, and then place the scale with it figures opposite the lines. When lines to indicate quantity therein are placed on the vessel they may be clear around the vessel or only at one or more places as desired. Of course both lines and figures might be on the scale. The scale should be placed within the container where it can not be tampered with and should be set back from the container far enough to prevent distortion by increased capillary attraction.

Referring now to the drawings, C, is the transparent container with lines, $c$, $c^1$, $c^2$, $c^3$, $c^4$, thereon.

The container is securely held between the pedestal, P, on which it seats with a leak tight joint, and the cover, $C^1$, by tie rods, R. Gasoline is supplied to the container through the fill pipe, F, and is drawn off to the hose, H, through the outlet O.

The scale, S, is preferably formed by cutting large numerals in one of the metal strips, $s$, which form the upright supports of the top and bottom rings, $s^1$, $s^2$, respectively. The rings and supports together form the cage which rests upon the part of the pedestal, P, which forms the floor of the container C. The cage may be rotated so as to place the scale, S, in any of the positions shown in Figure 1, or in any other position convenient for the customer.

The height of the scale is such and the numerals thereon are so placed that the 1 will be horizontally in line with the line, $c$, the 2 will be opposite the line, $c^1$, the 3 will be opposite the line, $c^2$, the 4 will be opposite the line, $c^3$, and the 5 will be opposite the line, $c^4$.

When the cover, $C^1$, is removed the cage may be lifted out, leaving nothing to interfere with cleaning the inside of the container.

I claim as my invention and desire to secure by Letters Patent of the United States:

1. The combination of a transparent graduated vessel with a removable replaceable frame arranged therein, said frame being provided with characters spaced to correspond with the graduations on said vessel, so that appropriate characters may be juxtaposed with their corresponding graduations on the vessel when the frame is seated therein.

2. The combination of a transparent cylindrical graduated vessel with a removable cylindrical cage rotatably arranged therein, said cage being provided with characters spaced to correspond with the graduations on said vessel, so that the appropriate characters may be juxtaposed with their corresponding graduations on the vessel when the cage is seated therein.

In testimony whereof I have hereunto set my hand in presence of two subscribing witnesses.

LINNAEUS E. BAKER.

Witnesses:
LAWRENCE H. PARROT,
JOHN R. WEMHOFF.